US012509553B2

(12) United States Patent
Saito et al.

(10) Patent No.: US 12,509,553 B2
(45) Date of Patent: Dec. 30, 2025

(54) RESIN COMPOSITION, METHOD FOR PRODUCING RESIN COMPOSITION, AND INSULATED ELECTRICAL WIRE

(71) Applicants: SUMITOMO ELECTRIC INDUSTRIES, LTD., Osaka (JP); SUMITOMO ELECTRIC WINTEC, INC., Koka (JP)

(72) Inventors: Hideaki Saito, Osaka (JP); Masaaki Yamauchi, Osaka (JP); Jun Sugawara, Koka (JP); Yudai Furuya, Koka (JP); Kengo Yoshida, Koka (JP); Yuji Hatanaka, Koka (JP)

(73) Assignees: SUMITOMO ELECTRIC INDUSTRIES, LTD., Osaka (JP); SUMITOMO ELECTRIC WINTEC, INC., Koka (JP)

( * ) Notice: Subject to any disclaimer, the term of this patent is extended or adjusted under 35 U.S.C. 154(b) by 1027 days.

(21) Appl. No.: 17/620,816

(22) PCT Filed: Jun. 20, 2019

(86) PCT No.: PCT/JP2019/024609
§ 371 (c)(1),
(2) Date: Dec. 20, 2021

(87) PCT Pub. No.: WO2020/255360
PCT Pub. Date: Dec. 24, 2020

(65) Prior Publication Data
US 2023/0017427 A1 Jan. 19, 2023

(51) Int. Cl.
C08G 73/10 (2006.01)
C08J 9/00 (2006.01)
C08J 9/10 (2006.01)
C08J 9/16 (2006.01)
C08J 9/32 (2006.01)
C08L 79/08 (2006.01)
C09D 179/08 (2006.01)

(52) U.S. Cl.
CPC ........ C08G 73/1007 (2013.01); C08J 9/0061 (2013.01); C08J 9/103 (2013.01); C08J 9/16 (2013.01); C08J 9/32 (2013.01); C08L 79/08 (2013.01); C09D 179/08 (2013.01); C08J 2379/08 (2013.01); C08J 2427/08 (2013.01); C08L 2203/202 (2013.01)

(58) Field of Classification Search
CPC ............ C08G 73/1007; C08G 73/1042; C08G 73/1071; C08J 9/0061; C08J 9/103; C08J 9/16; C08J 9/32; C08J 2379/08; C08J 2427/08; C08J 2203/22; C08J 9/102; C08L 79/08; C08L 2203/202; C08L 2205/20; C09D 179/08; C08K 7/28; H01B 3/306
See application file for complete search history.

(56) References Cited

U.S. PATENT DOCUMENTS

| 2005/0048297 | A1* | 3/2005 | Fukuda | C08G 73/1064 428/458 |
| 2009/0263745 | A1 | 10/2009 | Sakayori | |
| 2015/0203631 | A1* | 7/2015 | Miyazaki | C08G 73/1053 428/435 |
| 2019/0074106 | A1* | 3/2019 | Ota | H01B 7/0233 |
| 2020/0152348 | A1 | 5/2020 | Ota et al. | |

FOREIGN PATENT DOCUMENTS

| EP | 0 531 019 A1 | 3/1993 | |
| JP | H06-102667 A | 4/1994 | |
| JP | H09-059379 A | 3/1997 | |
| JP | 2004-285129 A | 10/2004 | |
| JP | 2006124700 A * | 5/2006 | |
| JP | 2009-244479 A | 10/2009 | |
| JP | 2011-133699 A | 7/2011 | |
| JP | 2016-151020 A | 8/2016 | |
| JP | 2018032563 A * | 3/2018 | ............... C08J 9/26 |
| JP | 2018-154129 A | 10/2018 | |
| WO | 2018/199211 A1 | 11/2018 | |

* cited by examiner

Primary Examiner — K. Boyle
(74) Attorney, Agent, or Firm — Oliff PLC

(57) ABSTRACT

The resin composition according to one aspect is a resin composition containing a polyamic acid and a solvent, wherein the polyamic acid has a repeating unit represented by the following general formula (1) in a molecular chain, and the molecular chain has a structure represented by the following general formula (2) at one end or both ends. The proportion of the structure represented by the following general formula (2) relative to 1 mol of the repeating unit represented by the following general formula (1) is 0.001 mol or more and 0.1 mol or less. In the following general formulas, $R^1$ is a tetravalent organic group; $R^2$ is a divalent organic group; and $R^3$ is an organic group having 15 or less carbon atoms.

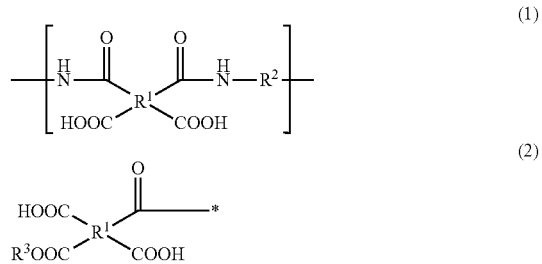

31 Claims, No Drawings

RESIN COMPOSITION, METHOD FOR PRODUCING RESIN COMPOSITION, AND INSULATED ELECTRICAL WIRE

TECHNICAL FIELD

The present disclosure relates to a resin composition, a method for producing the resin composition, and an insulated electrical wire.

BACKGROUND ART

As a method of controlling the molecular weight of a polyamic acid contained in a varnish without deterioration of coating film properties of a resin composition (varnish) used as insulating coating film of electrical wires, a method is disclosed in which less than 0.99 mol of a diamine compound is reacted with 1 mol of an acid dianhydride, then individual molecules are end-capped with alcohol, and further the diamine compound is added such that the amount reaches equal to that of the acid dianhydride (refer to Japanese Patent Laying-Open No. 9-59379).

CITATION LIST

Patent Literature

PTL 1: Japanese Patent Laying-Open No. 9-59379

SUMMARY OF INVENTION

The resin composition according to one aspect of the present disclosure is a resin composition containing a polyamic acid and a solvent, wherein the polyamic acid has a repeating unit represented by the following general formula (1) in a molecular chain, the molecular chain has a structure represented by the following general formula (2) at one end or both ends, and the proportion of the structure represented by the following general formula (2) relative to 1 mol of the repeating unit represented by the following general formula (1) is 0.001 mol or more and 0.1 mol or less:

[Chemical Formula 1]

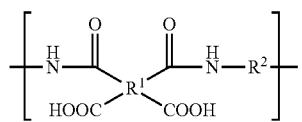

(1)

wherein, in general formula (1), $R^1$ is a tetravalent organic group; and $R^2$ is a divalent organic group,

[Chemical Formula 2]

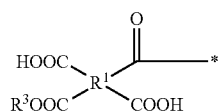

(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other, and * represents a binding site to a portion different from the structure represented by general formula (2) in the molecular chain.

DETAILED DESCRIPTION

Problem to be Solved by the Present Disclosure

In the method described in PTL 1, the productivity of the resin composition containing a polyamic acid is poor due to synthesis of varnish at multiple stages. Further, the resin composition produced by the method described in PTL 1 has a relatively low molecular weight, and is difficult to be increased in concentration for improvement in the production efficiency of an insulated electrical wire or the like.
The present disclosure has been made in view of the circumstances described above, and an object of the present disclosure is to provide a resin composition containing a high content of polyamic acid, having excellent physical properties of a coating film after curing and high productivity.

Advantageous Effect of the Present Disclosure

The resin composition of the present disclosure has excellent physical properties of a coating film after curing and high productivity, and can be increased in concentration. Therefore, the resin composition can be suitably used for forming the insulating layer of an insulated electrical wire.

DESCRIPTION OF EMBODIMENTS

The resin composition according to one aspect of the present disclosure is a resin composition containing a polyamic acid and a solvent, wherein the polyamic acid has a repeating unit represented by the following general formula (1) in a molecular chain, the molecular chain has a structure represented by the following general formula (2) at one end or both ends, and the proportion of the structure represented by the following general formula (2) relative to 1 mol of the repeating unit represented by the following general formula (1) is 0.001 mol or more and 0.1 mol or less:

[Chemical Formula 3]

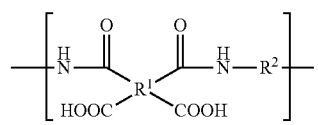

(1)

wherein, in general formula (1), $R^1$ is a tetravalent organic group; and $R^2$ is a divalent organic group;

[Chemical Formula 4]

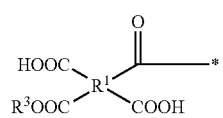

(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other; and * represents a binding site to a portion different from the structure represented by general formula (2) in the molecular chain.

The resin composition having a proportion of the structure represented by general formula (2) described above relative to 1 mol of the repeating unit controlled within the above range allows a polyamic acid having a high molecular weight to be easily obtained. Therefore, the resin composition can be easily and surely increased in concentration. Further, since the resin composition is obtained by a single-stage reaction process, the productivity is high.

"Organic group" herein refers to a group containing at least one carbon atom. Further, "proportion of the structure represented by general formula (2) relative to 1 mot of the repeating unit" is an amount obtained as follows. First, a resin composition diluted with N-methyl-2-pyrrolidone (NMP) is added dropwise to acetone while stirring with a stirrer. The solid content thus obtained is collected and dried under vacuum for 12 hours or more. About 30 mg of the collected solid content is dissolved in dimethyl sulfoxide-d6 (DMSO-d6), and measured by $^1$H NMR in a quantitative mode to obtain a spectrum. The measurement conditions include: Flip Angle-13.0 μs, PD-70 s, cumulated number-64, and room temperature (25° C.). Subsequently, the number of protons derived from a benzene ring appearing in the resulting spectrum (referred to as A) and the number of protons derived from $R^3$ appearing in the resulting spectrum (referred to as B) are determined. The number of protons appearing in the spectrum per mole of the repeating unit and the number of protons appearing in the spectrum per mole of a structure represented by general formula (2) can be calculated (represented by NA [mol] and NB [mol], respectively). Using these NA and NB, the proportion of the structure represented by general formula (2) relative to 1 mot of the repeating unit can be therefore determined by (B/NB)/(A/NA).

The ratio of the weight average molecular weight to the number average molecular weight of the polyamic acid is preferably 2.3 or less. With the ratio equal to or less than the above upper limit, the dispersion of the molecular weight of the polyamic acid is reduced, so that a high molecular weight substance can be easily obtained when the resin composition is cured. The physical properties of a coating film after curing can be therefore improved. "Weight average molecular weight" and "number average molecular weight" herein refer to the values measured in terms of polystyrene by gel permeation chromatography in accordance with JIS-K7252-1: 2008 "Plastics, Determination of average molecular mass and molecular mass distribution of polymers using size-exclusion chromatography, Part 1: General principles"

It is preferable that the weight average molecular weight of the polyamic acid be 15000 or more. With the weight average molecular weight of the polyamic acid equal to or more than the lower limit for example, film elongation in formation of the insulating layer of an insulated electrical wire can be easily secured.

It is preferable that the number average molecular weight of the polyamic acid be 8000 or more. With the number average molecular weight of the polyamic acid equal to or more than the lower limit, an insulating layer having excellent mechanical strength can be obtained, and the film strength of the insulating layer can be easily secured even under high thermal environment.

It is preferable that the polyamic acid be a polymer having a repeating unit in which $R^1$ is a benzene-1,2,4,5-tetrayl group. The polyamic acid made of the polymer has improved heat resistance after curing.

It is preferable that the polyamic acid be a copolymer having a repeating unit in which $R^1$ is a benzene-1,2,4,5-tetrayl group and a repeating unit in which $R^1$ is a biphenyl-3,3',4,4'-tetrayl group. The polyamic acid made of the copolymer has improved heat resistance and hygrothermal aging resistance after curing.

It is preferable that the average molar ratio between the repeating unit in which $R^1$ is a benzene-1,2,4,5-tetrayl group and the repeating unit in which $R^1$ is a biphenyl-3,3',4,4'-tetrayl group be 2:8 or more and 4:6 or less. With the average molar ratio within the range, the heat resistance and the hygrothermal aging resistance after curing can be further improved. "Average molar ratio" herein refers to a ratio between the repeating unit in which $R^1$ is a benzene-1,2,4,5-tetrayl group and the repeating unit in which $R^1$ is biphenyl-3,3',4,4'-tetrayl group in the entire resin composition. The average molar ratio may be determined through analysis of the spectrum measured by $^1$H NMR in the quantitative mode.

It is preferable that substantially no polyamic acid having an amino group at both ends of the molecular chain and no free diamine compound be contained. With the polyamic acid having an amino group at both ends of the molecular chain and the free diamine compound being not contained, a decrease in heat resistance during curing can be suppressed. "Free diamine compound" refers to an unreacted diamine compound contained in a resin composition.

It is preferable that the concentration of the polyamic acid be 25 mass % or more. With the concentration of the polyamic acid equal to or more than the lower limit, workability of the resin composition for use as resin composition for forming an insulating layer is improved. "Concentration of polyamic acid" herein is a concentration calculated by Wa/Wb×100 [mass %], wherein Wb is a mass before drying and Wa is a mass after drying, when the resin composition is dried at 250'C for 2 hours.

It is preferable that the solvent be an aprotic polar solvent. The aprotic polar solvent causes no reaction with an acid dianhydride and a diamine compound as raw materials of the polyamic acid, and can function as a suitable solvent for the polyamic acid.

It is preferable that the resin composition contain a pore forming agent. With the pore forming agent contained, the resin composition used for forming an insulating layer enables cavities to be included in the insulating layer. As a result, the dielectric constant of the insulating layer can be lowered, and the corona discharge starting voltage is improved. Accordingly, dielectric breakdown of the insulating layer is hardly caused.

It is preferable that the pore forming agent be a chemical foaming agent. The pore forming agent made of chemical foaming agent enables cavities to be easily formed during curing.

It is preferable that the pore forming agent be a thermally expandable microcapsule having a core material containing a thermal expansion agent and an outer shell surrounding the core material. With the pore forming agent made of thermally expandable microcapsule, controllability of the cavity size can be enhanced.

As main component of the core material, azobisisobutyronitrile and azodicarbodiamide are preferred. Since azobisisobutyronitrile and azodicarbodiamide generate $N_2$ gas by heating, the thermally expandable microcapsule may be thermally expanded while maintaining the chemical stability. "Main component" herein refers to a component with the highest content, for example, a component contained in an amount of 50 mass % or more.

As the main component of the outer shell, a vinylidene chloride-acrylonitrile copolymer is preferred. A vinylidene chloride-acrylonitrile copolymer has excellent stretchability, expands without breaking during expansion of the thermally expandable microcapsule, and easily forms a microballoon containing a generated gas.

It is preferable that the pore forming agent be a hollow forming particle having a core-shell structure. Since the hollow forming particle having a core-shell structure have a cavity and an outer shell obtained by thermal decomposition of the core after curing of the resin composition, communication of the cavities is suppressed even during cavity formation. Accordingly, with use as resin composition for forming an insulating layer, the dielectric breakdown voltage of the insulating layer is easily enhanced. "Core-shell structure" herein refers to a structure in which the material for forming the core of a particle and the material of the shell surrounding the core are different from each other.

It is preferable that the core of the hollow forming particle contain a thermally decomposable resin as main component, and the thermal decomposition temperature of the main component of the shell of the hollow forming particle be higher than the thermal decomposition temperature of the thermally decomposable resin. The constitution of the hollow forming particle enables a hollow particle composed of an outer shell alone with a hollow inside to be formed by heating, so that a cavity can be easily formed. "Thermal decomposition temperature" herein refers to a temperature at which the mass reduction ratio reaches 50% when the temperature is raised from room temperature at 10° C./min under nitrogen atmosphere.

It is preferable that the main component of the shell of the hollow forming particle be silicone. Use of silicone as the main component of the shell of the hollow forming particle imparts elasticity to the shell and easily improves the insulating properties and heat resistance, so that the closed cavity formed by the hollow forming particle can be easily maintained.

It is preferable that the pore forming agent be a high boiling point solvent having a boiling point higher than that of the solvent. Use of a high boiling point solvent as pore forming agent allows a cavity to be easily formed during curing.

It is preferable that the boiling point of the high boiling point solvent be 180° C. or more and 300° C. or less. With the boiling point of the high boiling point solvent within the range, the controllability of the cavity size can be enhanced.

It is preferable that the resin composition contain a thermally decomposable resin. With use of the resin composition containing a thermally decomposable resin for forming an insulating layer, the thermally decomposable resin is thermally decomposed by heating during curing, so that a cavity can be easily formed in the portion where the thermally decomposable resin is present during formation of the insulating layer.

It is preferable that the thermally decomposable resin be a crosslinked product of a (meth)acrylic-based polymer. A (meth)acrylic-based polymer tends to be uniformly distributed as an island phase of fine particle in a sea phase of polyamic acid. Further, the crosslinked product is excellent in compatibility with polyamic acid and easily takes a spherical shape. Accordingly, with use of a crosslinked product of the (meth)acrylic-based polymer as the thermally decomposable resin, spherical cavities can be uniformly distributed after curing.

The thermally decomposable resin may be formed of a spherical resin particle, and it is preferable that the resin particle have an average particle size of 0.1 μm or more and 50 μm or less. With use of the resin particle having an average particle size within the range, cavities having a uniform distribution are easily obtained. "Average particle size" herein refers to a particle size of particles having the highest volume content in the particle size distribution measured by a laser diffraction type particle size distribution measuring apparatus.

It is preferable that the resin composition contain a hollow filler. With use of the resin composition containing a hollow filler for forming an insulating layer, the hollow portion inside the hollow filler makes a cavity. Further, the flexibility and mechanical strength of the resulting insulating layer can be easily controlled.

It is preferable that the hollow filler be an organic resin balloon, a glass balloon, or a combination thereof. An organic resin balloon tends to increase the flexibility of the resulting insulating layer. A glass balloon tends to increase the mechanical strength of the resulting insulating layer. Accordingly, with use of the hollow filler made of organic resin balloon, glass balloon, or combination thereof, controllability of the flexibility and mechanical strength of the resulting insulating layer can be enhanced.

A method for producing a resin composition according to another aspect of the present disclosure is a method for producing a resin composition containing a polyamic acid and a solvent, the polyamic acid having a repeating unit represented by the following general formula (1) in a molecular chain, the molecular chain having a structure represented by the following general formula (2) at one end or both ends, the method comprising polymerizing an acid dianhydride represented by the following general formula (3) and a diamine compound represented by the following general formula (4) in the presence of an aprotic polar solvent and a reaction control agent, wherein the content of the reaction control agent relative to 100 mole of the acid dianhydride is 0.1 mol or more and 300 mol or less in the polymerization;

[Chemical Formula 5]

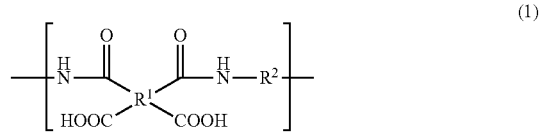

(1)

wherein, in general formula (1), $R^1$ is a tetravalent organic group; and $R^2$ is a divalent organic group,

[Chemical Formula 6]

(2)

wherein, in general formula (2), $R^1$ is as defined for $R^1$ in general formula (1); $R^1$ in general formula (2) may be the same as or different from R¹ in general formula (1); R³ is an organic group having 15 or less carbon atoms; in the case where both ends of the molecular chain has a structure of general formula (2), the two R¹ may be the same as or different from each other and the two R³ may be the same as or different from each other, and * represents a binding site to a portion different from the structure represented by general formula (2) in the molecular chain;

[Chemical Formula 7]

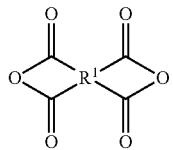
(3)

wherein, in general formula (3), R¹ is as defined for R¹ in general formula (1);

[Chemical Formula 8]

(4)

wherein, in general formula (4), R² is as defined for R² in general formula (1).

In the method for producing a resin composition, an acid dianhydride and a diamine compound are polymerized in the presence of an aprotic polar solvent and a reaction control agent, so that the production can be performed in one process at high productivity. Further, in the method for producing a resin composition, the molecular chain is end-capped with a structure represented by general formula (2) containing R³ derived from a reaction control agent in an appropriate amount. Accordingly, the method for producing a resin composition allows the molecular weight to be increased, while easily controlling the molecular weight of polyamic acid.

In the polymerization process, it is preferable that the acid dianhydride and the diamine compound be in substantially equimolar amounts. With the acid dianhydride and the diamine compound in substantially equimolar amounts in the polymerization process, the molecular weight of polyamic acid can be further increased.

"Substantially equimolar amounts" herein refers to a range in which the ratio between the two is 99:101 or more and 101:99 or less, preferably 99.9:100.1 or more and 100.1:99.9 or less.

It is preferable that R¹ be a benzene-1,2,4,5 tetrayl group. With use of benzene-1,2,4,5-tetrayl group as R¹, the resulting resin composition can have improved heat resistance after curing.

It is preferable that R¹ be a benzene-1,2,4,5-tetrayl group and a biphenyl-3,3', 4,4'-tetrayl group. With use of a benzene-1,2,4,5-tetrayl group and a biphenyl-3,3', 4,4'-tetrayl group as R¹, a copolymer having a repeating unit with a benzene-1,2,4,5-tetrayl group as R¹ and a repeating unit with a 3.3',4,4'-tetrayl group as R¹ is obtained as polyamic acid. With use of the polyamic acid as the copolymer, the resulting resin composition can have improved heat resistance and hygrothermal aging resistance after curing.

It is preferable that the molar ratio between the acid dianhydride having a benzene-1,2,4,5-tetrayl group as R¹ and the acid dianhydride having a biphenyl-3,3',4,4'-tetrayl group as R¹ be 2:8 or more and 4:6 or less. With the molar ratio within the range, the resulting resin composition can have further improved heat resistance and hygrothermal aging resistance after curing.

It is preferable that a pore forming agent be dispersed in the reaction mixture after the polymerization process. The resulting resin composition containing a pore forming agent used for forming an insulating layer allows the insulating layer to include cavities. As a result, the dielectric constant of the insulating layer can be lowered, and the corona discharge starting voltage is improved. Accordingly, the dielectric breakdown of the insulating layer is hardly caused.

It is preferable that a thermally decomposable resin be mixed with the reaction mixture after the polymerization process. The resulting resin composition containing a thermally decomposable resin for use forming an insulating layer allows the thermally decomposable resin to be thermally decomposed by heating during curing. Accordingly, a cavity can be easily formed in the portion where the thermally decomposable resin is present during formation of the insulating layer.

It is preferable that a hollow tiller be dispersed in the reaction mixture after the polymerization process. The resulting resin composition containing a hollow filler used for forming an insulating layer allows the flexibility and mechanical strength of the resulting insulating layer to be easily controlled.

Further, the insulated electrical wire according to still another aspect of the present disclosure is an insulated electrical wire having a linear conductor and an insulating layer that covers the conductor directly or via another layer, and the insulating layer is formed of the resin composition of the present disclosure.

Since the insulated electrical wire has an insulating layer formed of the resin composition, the productivity is high and the film elongation of the insulating layer is excellent.

DETAILS OF EMBODIMENT OF THE PRESENT DISCLOSURE

The embodiments of the resin composition, the method for producing the resin composition, and the insulated electrical wire according to the present disclosure are described in detail as follows.

First Embodiment

<Resin Composition>

The resin composition is a resin composition containing a polyamic acid and a solvent. Further, the resin composition contains a pore forming agent.

The lower limit of the viscosity of the resin composition at 30° C. is preferably 10000 cps, more preferably 15000 cps, and still more preferably 21000 cps. Further, the upper limit of the viscosity of the resin composition at 30° C. is preferably 100000 cps, more preferably 80000 cps. With a viscosity of the resin composition at 30'C less than the lower limit, uniform application of the resin composition is difficult, so that the coating of an insulated electrical wire may be insufficient. On the other hand, with a viscosity of the resin composition at 30° C. more than the upper limit, application of the resin composition may be difficult. The viscosity of the resin composition can be controlled through adjustment of the amount of the reaction control agent and the reaction temperature during reaction of the acid dianhydride and the diamine compound in the method for producing the resin composition described later.

It is preferable that the resin composition contain substantially no polyamic acid having amino groups at both ends of the molecular chain and no free diamine compound. With the resin composition containing no polyamic acid having amino groups at both ends of the molecular chain and no free diamine compound, decrease in heat resistance during curing can be suppressed.

(Polyamic Acid)

The polyamic acid has a repeating unit represented by the following general formula (1) in the molecular chain, and one end or both ends of the molecular chain has a structure represented by the following general formula (2).

[Chemical Formula 9]

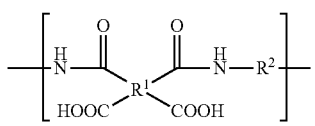

(1)

[Chemical Formula 10]

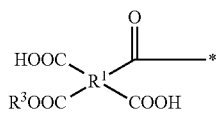

(2)

In general formula (1) and general formula (2), $R^1$ is a tetravalent organic group. Examples of $R^1$ include a benzene-1,2,4,5-tetrayl group, a biphenyl-3,3',4,4'-tetrayl group, a benzophenote-2,2',3,3'-tetrayl group, a benzophenone-3,3',4,4'-tetrayl group, a diphenyl ether-3,3',4,4'-tetrayl group, a 2,2-diphenylpropane-3,3',4,4'-tetrayl group, a 2,2-diphenylpropane-2,2',3,3'-tetrayl group, a 1,1-diphenylethane-3,3',4,4'-tetrayl group, a 1,1-diphenylethane-2,2',3,3'-tetrayl group, a diphenylmethane-3,3',4,4'-tetrayl group, a diphenylmethane-2,2',3,3'-tetrayl group, a diphenylsulfone-3,3',4,4'-tetrayl group, a naphthalene-1,2,5,6-tetrayl group, and a naphthalene-2,3,6,7-tetrayl group. Among these, a benzene-1,2,4,5-tetrayl group that improves the heat resistance and a biphenyl-3,3', 4,4'-tetrayl group that improves the hygrothermal aging resistance are preferred. $R^1$ described above may be used alone or in combination of two or more. In other words, in general formula (1) and general formula (2) described above, $R^1$ of molecular chains may be organic groups different from each other between the molecular chains, and may be organic groups different from each other in one molecular chain.

In general formula (I) described above, $R^2$ is a divalent organic group. Examples of $R^2$ include an m-phenylene group, a p-phenylene group, a 2,2-diphenylpropane-4,4'-diyl group, a 2,2-diphenylpropane-3,3'-diyl group, a 2-bis(4-phenoxyphenyl)propane-4,4'-diyl group, a diphenylmethane-4,4'-diyl group, a diphenylmethane-3,3'-diyl group, a diphenylsulfide-4,4'-diyl group, a diphenylsulfide-3,3'-diyl group, a diphenylsulfone-4,4'-diyl group, a diphenylsulfone-3,3'-diyl group, a diphenyl ether-4,4'-diyl group, a diphenyl ether-3,3'-diyl group, a biphenyl-4,4'-diyl group, a biphenyl-3,3'-diyl group, a 3,3'-dimethyibiphenyl-4,4'-diyl group, a 3,3'-dimethoxybiphenyl-4,4'-diyl group, a p-bis(1,l-dimethylpentyl)benzene-5,5'-diyl group, a naphthalene-1,5-diyl group, a naphthalene-2,6-diyl group, an m-xylene-2,5-diyl group, a p-xylene-2,5-diyl group, an m-xylylene group, a p-xylylene group, a 1,3,4-oxadiazole-2,5-diyl group, a 3,3'-dimethylbiphenyl-4,4'-diyl group, and a 2,2'-dimethylbiphenyl-4,4'-diyl group. $R^2$ described above may be used alone or in combination of two or more. In other words, in general formula (1) described above, $R^2$ of molecular chains may be organic groups different from each other between molecular chains, and may be organic groups different from each other in one molecular chain.

In general formula (2) described above, $R^3$ is an organic group having 1 or more and 15 or less carbon atoms. Examples of $R^3$ include a monovalent hydrocarbon group such as an ethyl group, a methyl group, an n-propyl group, an i-propyl group, a t-butyl group, an n-butyl group and an n-pentyl group, and a group obtained by substituting a part or all of the hydrogen atoms of these hydrocarbon groups with a hydroxyl group, such as a hydroxylethyl group, a hydroxypropyl group, a 1,3-dihydroxypropyl group, and a 1,2-dihydroxypropyl group. Among these, an ethyl group and a methyl group are preferred from the viewpoints of reactivity and cost.

It is preferable that the polyamic acid be a polymer having a repeating unit in which $R^1$ is a benzene-1,2,4,5-tetrayl group. The polyamic acid made of the polymer has improved heat resistance after curing.

Further, in another embodiment, it is preferable that the polyamic acid be a copolymer having a repeating unit in which $R^1$ is a benzene-1,2,4,5-tetrayl group and a repeating unit in which $R^1$ is a biphenyl-3,3',4,4'-tetrayl group. The polyamic acid made of the copolymer has improved heat resistance and hygrothermal ageing resistance after curing.

The lower limit of the average molar ratio between the repeating unit in which $R^1$ is a benzene-1,2,4,5-tetrayl group and the repeating unit in which $R^1$ is a biphenyl-3,3',4,4'-tetrayl group is preferably 10:90, more preferably 20:80. On the other hand, the upper limit of the average molar ratio is preferably 40:60, and more preferably 50:50. With an average molar ratio less than the lower limit, the insulating layer formed by curing the resin composition may have insufficient hygrothermal aging resistance. In contrast, with an average molar ratio more than the upper limit, the insulating layer formed by curing the resin composition may have insufficient heat resistance.

The molecular chain of the polyamic acid having a repeating unit represented by general formula (1) described above is end-capped with the structure represented by general formula (2) described above. With the molecular chain of the polyamic acid end-capped, the molecular weight of the polyamic acid can be controlled.

The lower limit of the proportion of the structure represented by general formula (2) described above relative to 1 mol of the repeating unit represented by general formula (1) described above is 0.001 mol, more preferably 0.002 mol. On the other hand, the upper limit of the proportion of the structure represented by general formula (2) described above is 0.1 mol, more preferably 0.07 mol. With a proportion of the structure represented by general formula (2) described above of less than the lower limit, the molecular chain is extended and the viscosity of the resin composition may become too high. In contrast, with a proportion of the structure represented by general formula (2) described above of more than the upper limit, the chain extension reaction during curing of the resin composition is inhibited, so that a sufficiently high molecular weight substance may not be obtained.

The molecular weight of the polyamic acid can be controlled through adjustment of the amount of the reaction control agent and the reaction temperature during reaction of the acid dianhydride and the diamine compound.

The lower limit of the weight average molecular weight (Mw) of the polyamic acid is preferably 15000, more preferably 16000. The upper limit of the weight average molecular weight of the polyamic acid is preferably 100000, more preferably 50000. With a weight average molecular weight of the polyamic acid less than the lower limit, the film elongation may be insufficient at the time of forming the insulating layer of the insulated electrical wire. On the other hand, with a weight average molecular weight of the polyamic acid more than upper limit, the viscosity of the resin composition may become too high.

The lower limit of the number average molecular weight (Mn) of the polyamic acid is preferably 8000, more preferably 10000, and still more preferably 15000. The upper limit of the number average molecular weight of the polyamic acid is preferably 100000, more preferably 50000. With a number average molecular weight of the polyamic acid less than the lower limit, the low molecular weight component increases, so that the mechanical strength of the resulting insulating layer may decrease or the film strength of the insulating layer may not be maintained in a high temperature enviro anent. On the other hand, with a number average molecular weight of the polyamic acid more than the upper limit, the viscosity of the resin composition may increase too high.

Further, the upper limit of the ratio (Mw/Mn) of the weight average molecular weight (Mw) to the number average molecular weight (Mn) of the polyamic acid is preferably 2.3, more preferably 2.1. The ratio (Mw/Mn) is an index indicating the polydispersity of the molecular weight of the polyamic acid. With a ratio (Mw/Mn) more than the upper limit, the molecular weight of the polyamic acid tends to spread toward the low molecular weight side, so that a sufficiently high molecular weight substance may not be obtained in curing of the resin composition.

The lower limit of the concentration of the polyamic acid relative to the whole resin composition is preferably 25 mass %, more preferably 26 mass %. On the other hand, the upper limit of the concentration of the polyamic acid is preferably 35 mass %, more preferably 34 mass %. With a concentration of the polyamic acid less than the lower limit, the workability of the resin composition for use as insulating layer of an insulated electrical wire may decrease. On the other hand, with a concentration of the polyamic acid more than the upper limit, the viscosity of the resin composition may increase too high.

(Solvent)

Various organic solvents can be used as the solvent, and it is preferable that the solvent is an aprotic polar solvent. This aprotic polar solvent causes no reaction with the acid dianhydride and the diamine compound as the raw materials of the polyamic acid, and can function as a suitable solvent for the polyamic acid.

The lower limit of the amount of the aprotic polar solvent relative to 100 mol of the repeating unit is preferably 500 mol, more preferably 800 mol. On the other hand, the upper limit of the amount of the aprotic polar solvent is preferably 1500 mol, more preferably 1200 mol. With an amount of the aprotic polar solvent less than the lower limit, the polymerization reaction between the acid dianhydride and the di amine compound as the raw materials of the polyamic acid proceeds rapidly, so that the viscosity of the resin composition may increase too high. In contrast, with an amount of the aprotic polar solvent more than the upper limit, a large amount of the solvent is required to be volatized for use as the resin composition for the insulating layer of an insulated electrical wire, so that formation of the insulating layer may require time.

Examples of the aprotic polar solvent include N-methyl-2-pyrrolidone (NMP), N, N-dimethyacetamide (DMAc), and dimethylfonnamide (DMF). These may be used alone or as a mixture of two or more.

(Pore Forming Agent)

The resin composition containing a pore forming agent for forming an insulating layer allows cavities to be included in the insulating layer. Accordingly, the dielectric constant of the insulating layer can be lowered, so that the corona discharge starting voltage is improved. As a result, the dielectric breakdown of the insulating layer is hardly caused.

Examples of the pore forming agent include a chemical foaming agent, a thermally expandable microcapsule, a hollow forming particle having a core-shell structure, and a high boiling point solvent.

<Chemical Foaming Agent>

When the insulating layer of an insulated electrical wire is formed by application and curing of the resin composition on a conductor, the chemical foaming agent foams when heated during baking for curing, so that cavities are generated in the insulating layer. The use of the chemical foaming agent as pore forming agent, cavities can be easily funned during baking for curing of the resin composition.

As the chemical foaming agent, for example, a substance having a thermal decomposability such as arobisisobutyronitrile and azodicarbodiamide which generates nitrogen gas ($N_2$ gas) when heated is suitably used.

The lower limit of the foaming temperature of the chemical foaming agent is preferably 180° C., more preferably 210'C. On the other hand, the upper limit of the foaming temperature is preferably 300° C., more preferably 260° C. With a foaming temperature less than the lower limit, foaming tends to occur before baking, so that adjustment of the thickness of the insulating layer may be difficult. In contrast, with a foaming temperature more than the upper limit, increase in the baking temperature and prolongation of the baking time are caused, so that production cost of an insulated electrical wire may increase. "Foaming temperature" herein is the temperature at which the foaming agent starts foaming. Further, "baking time" is the time period for holding a conductor coated with the resin composition at the baking temperature.

<Thermally Expandable Microcapsule>

A thermally expandable microcapsule has a core material containing a thermal expansion agent and an outer shell surrounds the core material. The thermally expandable microcapsule allows the thermal expansion agent contained in the core material to expand or foam when heated during baking for curing, so that the outer shell is expanded to form a cavity. Accordingly, with use of the thermally expandable microcapsule as the pore forming agent, controllability of the cavity size can be enhanced.

The thermal expansion agent may be any one that expands or generates a gas when heated, and the mechanism thereof is not limited. As the thermal expansion agent, for example, a low boiling point liquid, a chemical foaming agent, or a mixture thereof may be used. Examples of the low boiling point liquid include an alkane such as butane, i-butane, n-pentane, 1-pentane and neopentane, and freons such as trichlorofluoromethane. Further, examples of the chemical foaming agent include a substance having a thermal decomposability such as azobisisobutyronitrile and azodicartodiamide which generates $N_2$ gas when heated.

It is preferable that the core material contain the thermal expansion agent as main component. In particular, azobisisobutyronitrile and azodicarbodiamide are preferred as main component of the core material. Azobisisobutyronitrile and azodicarbodiamide generate $N_2$ gas when heated, so that thermal expansion can be achieved while maintaining the chemical stability of the thermally expandable microcapsule.

The expansion start temperature of the thermal expansion agent, i.e., the boiling point of a low boiling point liquid or the thermal decomposition temperature of a chemical foaming agent, is set to the softening temperature of the outer shell of a thermally expandable microcapsule described later or more. More specifically, the lower limit of the expansion start temperature of the thermal expansion agent is preferably 60° C., more preferably 70° C. On the other hand, the upper limit of the expansion start temperature of the thermal expansion agent is preferably 200° C., more preferably 150° C. With an expansion start temperature of the thermal expansion agent less than the lower limit, the thermally expandable microcapsule may unintentionally expand during formation of the insulating layer, transportation, or storage. In contrast, with an expansion start temperature of the thermal expansion agent more than the upper limit, the energy cost required for expanding the thermally expandable microcapsule may increase too high.

The material of the outer shell is a stretchable material capable of expanding without fracture during expansion of the thermal expansion agent and forming a microballoon enclosing the generated gas. As the main component of the outer shell, a resin composition such as thermoplastic resin is usually used. Examples of the thermoplastic resin include a polymer formed from monomers such as vinyl chloride, vinylidene chloride, acrylonitrile, acrylic acid, methacrylic acid, acrylate, methacrylate, and styrene, or a copolymer formed from two or more types of the monomers.

As the main component of the outer shell, a vinylidene chloride-acrylonitrile copolymer is preferred in particular. The vinylidene chloride-acrylonitrile copolymer has excellent stretchability and expands without fracture during expansion of the thermally expandable microcapsule, so that a microballoon enclosing generated gas is easily formed. In the case of using a vinylidene chloride-acrylonitrile copolymer as main component of the outer shell, the expansion start temperature of the thermal expansion agent is set to 80° C. or more and 150° C. or less.

<Hollow Forming Particle>

By gasification of the core for removal through heating for baking, a hollow forming particle having a core-shell structure gives a hollow particle. The hollow forming particle has a cavity obtained by thermal decomposition of the core after curing of the resin composition and an outer shell, so that the communication of the cavities is suppressed even when the cavities are formed. Accordingly, use as the resin composition for forming an insulating layer allows the dielectric breakdown voltage of the insulating layer to be easily increased.

It is preferable that the core of the hollow forming particle contain a thermally decomposable resin as main component. The thermally decomposable resin is not particularly limited, and examples thereof include a compound in which one or both ends or a part of polyethylene glycol, polypropylene glycol or the like is alkylated, (meth)acrylated or epoxidized; a polymer of (meth)acrylic acid ester having an alkyl group having 1 or more and 6 or less carbon atoms such as polymethyl (meth)acrylate, polyethyl(meth)acrylate, polypropyl (meth)acrylate, and polybutyl (meth)acrylate; a urethane oligomer and a urethane polymer; a polymer of modified (meth)acrylate such as urethane (meth)acrylate, epoxy (meth)acrylate, and ε-caprolactone (meth)acrylate; poly(meth)acrylic acid; a crosslinked product thereof, and polystyrene and crosslinked polystyrene. In particular, a polymer of (meth)acrylic acid ester having an alkyl group having 1 or more and 6 or less carbon atoms is preferred from the viewpoint of easy formation of cavities in an insulating layer. Examples of the polymer of (meth)acrylic acid ester include polymethyl methacrylate (PMMA).

It is preferable that the shape of the core be spherical. In order to make the shape of the core spherical, for example, a spherical thermally decomposable resin particle may be used as the core. In the case of using a spherical thermally decomposable resin particle, the lower limit of the average particle size of the resin particle is, for example, preferably 0.1 μm, more preferably 0.5 μm, and still more preferably 1 μm, though not particularly limited. On the other hand, the upper limit of the average particle size of the resin particle is preferably 15 μm, more preferably 10 μm. With an average particle size of the resin particle less than the lower limit, a hollow forming particle having the resin particle as core may be hardly produced. In contrast, with an average particle size of the resin particle more than the upper limit, the hollow forming particle having the resin particle as core is too large, so that the distribution of cavities in an insulating layer is hardly uniform. Accordingly, the distribution of dielectric constant may be biased.

It is preferable that the main component of the shell for use have a thermal decomposition temperature higher than the thermal decomposition temperature of the thermally decomposable resin. The hollow forming particle having such a structure enables a hollow particle composed of an outer shell alone with a hollow inside formed by heating to be produced, so that a cavity can be easily formed. Further, it is preferable that the main component of the shell have a low dielectric constant and high heat resistance. Examples of the material for use as the main component of the shell include a resin such as polystyrene, silicone, fluororesin, and polyimide. "Fluororesin" herein refers to a resin in which at least one hydrogen atom bonded to a carbon atom constituting the repeating unit of a polymer chain is substituted with a fluorine atom or an organic group having a fluorine atom (hereinafter, also referred to as "fluorine atom-containing group"). The fluorine atom-containing group has at least one of the hydrogen atoms in a straight-chain or branched organic group substituted with a fluorine atom, and examples thereof include a fluoroalkyl group, a fluoroalkoxy group, and a fluoropolyether group. The shell may contain a metal as long as the insulating property is not impaired.

In particular, silicone is preferred as the main component of the shell. As a result, closed cavities formed by the hollow forming particle are more easily maintained. The shell of the hollow forming particle containing silicone as the main component imparts elasticity to the shell and easily improves the insulating property and heat resistance. As a result, the closed cavity formed by the hollow forming particle is more easily maintained.

The lower limit of the average thickness of the shell is, for example, preferably 0.01 μm, more preferably 0.02 μm, though not particularly limited. On the other hand, the upper limit of the average thickness of the shell is preferably 0.5 μm, more preferably 0.4 μm. With an average thickness of the shell less than the lower limit, the effect of suppressing communication of the cavities may not be sufficiently obtained. In contrast, with an average thickness of the shell more than the upper limit, the volume of the cavity is too small, so that the porosity of an insulating layer may not be increased more than a predetermined value. The shell may be formed of one layer or a plurality of layers. In the case where the shell is formed of a plurality of layers, an average of the total thickness of the layers within the range is acceptable.

The upper limit of the CV value of the hollow forming particle is preferably 30%, more preferably 20%. With a CV value of the hollow forming particle more than the upper limit, the insulating layer contains a plurality of cavities having different sizes, so that the distribution of the dielectric constant may be easily biased. The lower limit of the CV value of the hollow forming particle is, for example, preferably 1%, though not particularly limited. With a CV value of the hollow forming particle less than the lower limit, the production cost of the hollow forming particle may be too expensive. "CV value" herein refers to a coefficient of variation defined in JIS-Z8825 (2013).

The hollow forming particle may have a structure in which the core is formed of one thermally decomposable resin particle, or a structure in which the core is formed of a plurality of thermally decomposable resin particles and the shell covering these decomposable resin particles.

Further, the surface of the hollow forming particle may be smooth without unevenness, or may have unevenness formed thereon.

<High Boiling Point Solvency>

The high boiling point solvent has a higher boiling point than the solvent of the resin composition and is used for forming a cavity. The lower limit of the boiling point of the high boiling point solvent is preferably 180° C., more preferably 210° C. On the other hand, the upper limit of the boiling point of the high boiling point solvent is preferably 300° C., more preferably 260° C. With a boiling point of the high boiling point solvent less than the lower limit, the amount of volatilization increases when the solvent of the resin composition is volatilized, so that cavities may be insufficiently formed. In contrast, with a boiling point of the high boiling point solvent more than the upper limit, the high boiling point solvent hardly volatilize, so that cavities may be insufficiently formed As the high boiling point solvent, diethylene glycol dimethyl ether, triethylene glycol dimethyl ether, diethylene glycol dibutyl ether, tetraethylene glycol dimethyl ether, tetraethylene glycol monomethyl ether, etc. may be used. Triethylene glycol dimethyl ether is preferred due to small variation in the cavity diameter. In addition to these, dipropylene glycol dimethyl ether, diethylene glycol ethyl methyl ether, dipropylene glycol monomethyl ether, diethylene glycol diethyl ether, diethylene glycol monomethyl ether, diethylene glycol butyl methyl ether, tripropylene glycol dimethyl ether, diethylene glycol monobutyl ether, ethylene glycol monophenyl ether, triethylene glycol monomethyl ether, triethylene glycol butyl methyl ether, polyethylene glycol dimethyl ether, polyethylene glycol monomethyl ether, propylene glycol monoethyl ether, etc. may be also used.

Although one type of the high boiling point solvent may be used alone, it is preferable to use two or more in combination because the effect for generating cavities in a wide temperature range can be obtained. Examples of the preferred combination of two or more types for use include a combination including tetraethylene glycol dimethyl ether and diethylene glycol dibutyl ether, diethylene glycol dibutyl ether and triethylene glycol dimethyl ether, triethylene glycol monomethyl ether and tetraethylene glycol dimethyl ether, or triethylene glycol butyl methyl ether and tetraethylene glycol dimethyl ether. Examples of the more preferred combination include a combination including diethylene glycol dibutyl ether and triethylene glycol dimethyl ether, or triethylene glycol monomethyl ether and tetraethylene glycol dimethyl ether.

As described above, the high boiling point solvent has a higher boiling point than the solvent of the resin composition, and in the case where one type of the high boiling point solvent is used, it is preferable that the lower limit of difference in the boiling point be 10° C. in the case of using one type alone, it is known that the high boiling point solvent has both roles of a cavity nucleating agent and a foaming agent. In contrast, in the case of using two or more types of high boiling point solvent, a high boiling point solvent having a highest boiling point (hereinafter, also referred to as "highest boiling point solvent") functions as a foaming agent, and other high boiling point solvents function as cavity nucleating agent. In that case, the lower limit of the difference in boiling point between the highest boiling point solvent and the solvent of the resin composition is preferably 20° C., more preferably 30° C. On the other hand, it is preferable that the upper limit of the difference in boiling point be 60° C. Further, it is preferable that the lower limit of the difference in boiling point between the other high boiling point solvent and the solvent of the resin composition be 10° C.

In the case of using two or more types of high boiling point solvents, the lower limit of the mass ratio between the highest boiling point solvent and another high boiling point solvent (total for two or more types) is preferably 1:99, more preferably 1:10. On the other hand, the upper limit of the ratio is preferably 99:1, more preferably 10:1. With the ratio within the range, the cavity can be easily generated.

Further, it is preferable that in comparison with solubility of the polyamic acid in the highest boiling point solvent, the solubility of the polyamic acid in the other high boiling point solvent be larger. In the case where the solubilities of the polyamic acid have the relationship described above, it is easy to form uniform cavities.

(Advantage)

With a proportion of the structure represented by general formula (2) described above relative to 1 mol of the repeating unit within the range, a high molecular weight polyamic acid having a controlled molecular weight can be easily obtained. Accordingly, the resin composition can be easily and surely increased in concentration. Further, since the resin composition is obtained in one stage reaction process, the productivity is high.

<Method for Producing Resin Composition>

A method for producing the resin composition enables to produce a resin composition containing a polyamic acid and a solvent, the polyamic acid having a repeating unit represented by the following general formula (1) in a molecular chain, the molecular chain having a structure represented by the following general formula (2) at one end or both ends, i.e. the resin composition. The method for producing the resin composition comprises a polymerization process and a process for dispersing a pore forming agent.

[Chemical Formula 11]

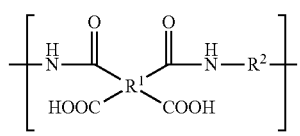

(1)

wherein, in general formula (1), R¹ is a tetravalent organic group; and R² is a divalent organic group,

[Chemical Formula 12]

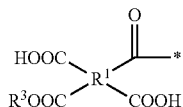
(2)

wherein, in general formula (2), R¹ is as defined for R¹ in general formula (1); R¹ in general formula (2) may be the same as or different from R¹ in general formula (1); R³ is an organic group having 15 or less carbon atoms; in the case where both ends of the molecular chain has a structure of general formula (2), the two R¹ may be the same as or different from each other and the two R¹ may be the same as or different from each other, and * represents a binding site to a portion different from the structure represented by general formula (2) in the molecular chain.

(Polymerization Process)

in the polymerization process described above, an acid dianhydride represented by the following general formula (3) and a diamine compound represented by the following general formula (4) are polymerized in the presence of an aprotic polar solvent and a reaction control agent:

[Chemical Formula 13]

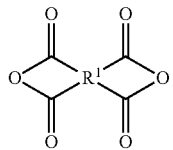
(3)

wherein, in general formula (3), R¹ is as defined for R¹ in general formula (1);

[Chemical Formula 14]

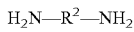
(4)

$H_2N-R^2-NH_2$ wherein, in general formula (4), R² is as defined for R² in general formula (1).

Examples of the acid dianhydride include pyromellitic dianhydride (PMDA), biphenyltetracarboxylic dianhydride (BPDA), 2,2',3,3'-benzophenonetetracarboxylic dianhydride, 3,3',4,4'-benzophenonetetracarboxylic dianhydride, 4,4'-oxydiphthalic dianhydride, 2,2-bis(3,4-dicarboxyphenyl)propane dianhydride, 2,2-bis(2,3-dicarboxyphenyl)propane dianhydride, 1,1-bis(3,4-dicarboxyphenyl)ethane dianhydride, 1,1-bis(2,3-dicarboxyphenyl)ethane dianhydride, bis(3,4-dicarboxyphenyl)methane dianhydride, bis(2,3-dicarboxyphenyl)methane dianhydride, bis(3,4-dicarboxyphenyl)sulfone dianhydride, bis(3,4-dicarboxyphenyl) ether dianhydride, 1,2,5,6-naphthalenetetracarboxylic dianhydride, and 2,3,6,7-naphthalenetetracarboxylic dianhydride. The acid dianhydride may be used alone or in combination of two or more.

It is preferable that the acid dianhydride be a pyromellitic dianhydride, that is, R¹ described above be a benzene-1,2,4,5-tetrayl group. With use of a benzene-1,2,4,5-tetrayl group as R¹ described above, the resulting resin composition has improved heat resistance after curing.

In another embodiment, it is preferable that the acid dianhydrides be pyromellitic dianhydride and biphenyltetracarboxylic dianhydride, that is, R¹ be a benzene-1,2,4,5-tetrayl group and a biphenyl-3,3',4,4'-tetrayl group. With use of a benzene-1,2,4,5-tetrayl group and a biphenyl-3,3',4,4'-tetrayl group as R¹ described above, a copolymer including a repeating unit having a benzene-1,2,4,5 tetrayl group as R¹ and a repeating unit having a biphenyl-3,3',4,4'-tetrayl group as R¹ is obtained as polyamic acid. The polyamic acid as copolymer described above allows the resulting resin composition to have improved heat resistance and hygrothenmal aging resistance after curing.

The lower limit of the molar ratio between the pyromellitic dianhydride in which R¹ is a benzene-1,2,4,5-tetrayl group and the biphenyltetracarboxylic dianhydride in which R¹ is a biphenyl-3,3',4,4'-tetrayl group is preferably 2:8, more preferably 1:3. On the other hand, the upper limit of the molar ratio is preferably 4:6, more preferably 1:2. With a molar ratio less than the lower limit, the hygrothermal aging resistance of an insulating layer formed by curing the resulting resin composition may be insufficient. In contrast, with a molar ratio more than the upper limit, the heat resistance of an insulating layer formed by curing of the resulting resin composition may be insufficient.

As the diamine compound, an aromatic diamine or a derivative thereof is used. Examples of the diamine compound include m-phenylenediamine, p-phenylenediamine, 4,4'-diamino-diphenylpropane, 3,3'-diamino-diphenylpropane, 2,2-bis[4(4-aminophenoxy)phenyl]propane, 4,4'-diamino-diphenylmethane, 3,3'-diamino-diphenylmethane, 4,4'-diamino-diphenylsulfide, 3,3'-diamino-diphenylsulfide, 4,4'-diamino-diphenylsulfone, 3,3'-diamino-diphenylsulfone, 4,4'-diamino-diphenyl ether, 3,3'-diamino-diphenyl ether, benzidine, 3,3'-diamino-biphenyl, 3,3'-dimethyl-4,4'-diaminobiphenyl, 3,3'-dimethoxy-benzidine, p-bis(1,1-dimethyl-5-aminopentyl)benzene, 1,5-diamino-naphthalene, 2,6-diamino-naphthalene, m-xylene-2,5-diamine, p-xylene-2,5-diamine, m-xylylene-diamine, p-xylylene-diamine, 2,5-diamino-1,3,4-oxadiazole, m-tolidine, and o-tolidine, though not limited thereto. Further, the diamine compound may be used alone or in combination of two or more.

Examples of the reaction control agent include an alcohol having 1 or more and 15 or less carbon atoms. Specifically, a monohydric alcohol such as ethanol, methanol, n-propyl alcohol, i-propyl alcohol, t-butyl alcohol, n-butyl alcohol and n-pentyl alcohol, and polyhydric alcohol such as ethylene glycol, propylene glycol and glycerol. In particular, ethanol and methanol are preferred from the viewpoints of reactivity and cost.

Since the aprotic polar solvent may be the same as the aprotic polar solvent for the resin composition described above, detailed description thereof is omitted.

Specifically, the polymerization process may be performed by, for example, the following procedure. First, an aprotic polar solvent and a reaction control agent are mixed, and a diamine compound is dissolved in the aprotic polar solvent and the reaction control agent. Subsequently, an acid dianhydride is added to the solution in which the diamine compound is dissolved in the aprotic polar solvent and the reaction control agent so as to polymerize the acid dianhydride and the diamine compound.

Although the case where an acid dianhydride is added to a solution in which a diamine compound is dissolved in an aprotic polar solvent and a reaction control agent is described as follows as an example, polymerization may be performed by a method including adding a diamine compound to a solution in which an acid dianhydride is dissolved in an aprotic polar solvent and a reaction control agent.

It is preferable that the acid dianhydride be added at a constant rate while stirring the solution. The polymerization reaction can be easily controlled through addition of the acid dianhydride at a constant rate.

The temperature during polymerization reaction and the charging time of the acid dianhydride are appropriately determined depending on the amount of the resin composition to be produced, etc.

The lower limit of the content of the reaction control agent relative to 100 mol of the acid dianhydride is 0.1 mol. On the other hand, the upper limit of the content of the reaction control agent is 300 mol. With a content of the reaction control agent less than the lower limit, the reaction of the acid dianhydride and the diamine compound proceeds excessively until the molecular chain end of the polyamic acid makes a structure represented by general formula (2), so that the viscosity of the resin composition may increase too high. In contrast, with a content of the reaction control agent more than the upper limit, the molecular chain end of the polyamic acid rapidly makes a structure represented by general formula (2) described above in surplus. Accordingly, the chain extension reaction during curing of the resin composition is inhibited, so that a sufficiently high molecular weight substance may not be obtained.

Further, it is preferable that in the polymerization process, the acid dianhydride and the diamine compound be in substantially equimolar amounts. With use of the acid dianhydride and the diamine compound in substantially equimolar amounts in the polymerization process, the molecular weight of the polyamic acid can be further increased.

(Process for Dispersing Pore Forming Agent)

It is preferable that a process for dispersing the pore forming agent have a process for mixing a thermally decomposable resin with a reaction mixture after the polymerization process. The resulting resin composition containing the thermally decomposable resin used for forming an insulating layer allows the thermally decomposable resin to be thermally decomposed by heating during curing, so that a cavity can be easily formed in the portion where the thermally decomposable resin is present during formation of the insulating layer.

Since the pore forming agent may be the same as the pore forming agent for the resin composition described above, detailed description thereof is omitted.

The content of the pore forming agent is appropriately determined based on the solid content of the resin composition, such that the porosity of an insulating layer to be formed has a desired value.

The lower limit of the porosity of an insulating layer to be formed is preferably 5 vol %, more preferably 10 vol %. On the other hand, the upper limit of the porosity is preferably 80 vol %, more preferably 50 vol %. With a porosity less than the lower limit, the dielectric constant of an insulating layer is insufficiently lowered, so that the corona discharge starting voltage may be insufficiently improved. In contrast, with a porosity more than the upper limit, the mechanical strength of the insulating layer may not be maintained.

(Advantage)

In the method for producing a resin composition, an acid dianhydride and a diamine compound are polymerized in the presence of an aprotic polar solvent and a reaction control agent, so that the production can be performed in one process at high productivity. Further, in the method for producing a resin composition, the molecular chain is end-capped with a structure represented by general formula (2) containing $R^3$ derived from a reaction controlling agent in an appropriate amount. Accordingly, the method for producing a resin composition allows the molecular weight to be increased, while easily controlling the molecular weight of polyamic acid.

<Insulated Electrical Wire>

The insulated electrical wire has a linear conductor and an insulating layer that covers the conductor directly or via another layer.

(Conductor)

The conductor usually contains a metal as main component. The metal is not particularly limited, and copper, a copper alloy, aluminum, or an aluminum alloy is preferred. With use of the metal described above as conductor, an insulated electrical wire having both of good workability and conductivity can be obtained.

The conductor may contain other components such as known additives in addition to the metal as the main component.

The cross-sectional shape of the conductor is not particularly limited, and various shapes such as a circle, a square, and a rectangle may be adopted. Further, the size of the cross section of the conductor is not particularly limited, and the diameter (short side width) may be, for example, 0.2 mm or more and 2.0 mm or less.

(Insulating Layer)

The insulating layer is laminated on the peripheral surface side of the conductor so as to cover the conductor. Covering with the insulating layer may be performed via another layer. Specifically, the coating layer of the conductor may have a multilayer structure including a layer other than the insulating layer.

The insulating layer may be formed by applying and curing (baking) the resin composition. In other words, the insulating layer is formed of the resin composition of the present disclosure. The insulated electrical wire has an insulating layer formed of the resin composition of the present disclosure, so that high productivity is achieved and film elongation of the insulating layer is excellent.

The average thickness of the insulating layer is usually 2 μm or more and 200 μm or less, though not particularly limited.

(Method for Producing Insulated Electrical Wire)

The insulated electrical wire can be effectively obtained by a production method including an application process and a process for forming an insulating layer.

In the application process, the resin composition is applied to the outer periphery of the conductor directly or via another layer. A method of applying the resin composition to the outer peripheral surface side of the conductor includes, for example, a method using a coating apparatus having a liquid composition tank for storing the resin composition and a coating die. With use of the coating apparatus, the resin composition adheres to the outer peripheral surface side of the conductor when the conductor is inserted into the liquid composition tank, and then the resin composition is applied to an approximately uniform thickness when the conductor passes through the coating die.

In a process for forming the insulating layer, the resin composition applied on a conductor in the application process is heated to be cured for formation of the insulating layer. By the heating, the solvent in the resin composition is volatilized, and the polyamic acid is cured to form polyimide. An insulating layer having excellent electrical properties, mechanical properties, thermal properties, etc. can be thus obtained.

The apparatus for use in the process for forming the insulating layer may be, for example, a tubular baking furnace that is long in the traveling direction of the conductor, though not particularly limited. The heating method is not particularly limited, and a conventionally known method such as hot air heating, infrared heating, and high frequency heating may be used.

Further, the heating temperature may be, for example, 350° C. or more and 500° C. or less, and the heating time may be 5 seconds or more and 1 minute or less. With a heating temperature or a heating time of less than the lower limit, vaporization of the solvent and formation of the insulating layer are insufficient, so that the appearance, electrical properties, mechanical properties, thermal properties, etc. of the insulated electrical wire may be poor. In contrast, with a heating temperature of more than the upper limit, foaming and deterioration of mechanical properties of the insulating layer may be caused due to the excessively rapid heating. Further, with a heating time of more than the upper limit, the productivity of the insulated electrical wire may decrease.

The application process and the process for forming the insulating layer are usually repeated a plurality of times. The thickness of the insulating layer can thus be increased. On this occasion, the hole diameter of the coating die is appropriately adjusted corresponding to the number of repetitions.

Second Embodiment

<Resin Composition>

The resin composition is a resin composition containing a polyamic acid and a solvent. Further, the resin composition contains a thermally decomposable resin.

The viscosity of the resin composition at 30° C. may be the same as that of the resin composition in the first embodiment. Further, it is preferable that the resin composition contain substantially no polyamic acid having amino groups at both ends of the molecular chain and no free diamine compound.

(Polyamic Acid)

The polyamic acid has a repeating unit represented by the following general formula (1) in a molecular chain, the molecular chain having a structure represented by the following general formula (2) at one end or both ends:

[Chemical Formula 15]

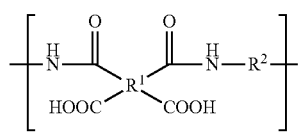

(1)

[Chemical Formula 16]

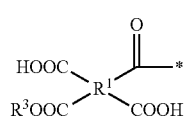

(2)

Since the polyamic acid may be the same as the polyamic acid in the first embodiment, detailed description thereof is omitted.

(Solvent)

Since the solvent may be the same as the solvent in the first embodiment, detailed description thereof is omitted.

(Thermally Decomposable Resin)

With use of the resin composition containing the thermally decomposable resin for forming an insulating layer, the thermally decomposable resin is thermally decomposed by heating during curing, so that a cavity can be formed in the portion where the thermally decomposable resin is present during formation of the insulating layer.

As the thermally decomposable resin, a resin that is thermally decomposed at a temperature lower than the heating temperature during curing of the resin composition is preferably used. The thermally decomposable resin is not particularly limited, and examples thereof include a compound in which one or both ends or a part of polyethylene glycol, polypropylene glycol or the like is alkylated, (meth)acrylated or epoxidized; a polymer of (meth)acrylic acid ester having an alkyl group having 1 or more and 6 or less carbon atoms such as polymethyl (meth)acrylate, polyethyl (meth)acrylate, polypropyl (meth)acrylate, and polybutyl (meth)acrylate; a urethane oligomer and a urethane polymer; a polymer of modified (meth)acrylate such as urethane (meth)acrylate, epoxy (meth)acrylate, and ε-caprolactone (meth)acrylate; poly(meth)acrylic acid; a crosslinked product thereof; and polystyrene and crosslinked polystyrene.

In particular, a crosslinked product of a (meth)acrylic-based polymer is preferred as the thermally decomposable resin. The (meth)acrylic-based polymer tends to be uniformly distributed as an island phase of fine particles in a sea phase of polyamic acid. Further, due to being a crosslinked product, the compatibility with polyamic acid is excellent and a spherical shape is easily formed. Accordingly, use of a crosslinked product of (meth)acrylic-based polymer as the thermally decomposable resin enables spherical cavities to be uniformly distributed after curing.

The crosslinked poly(meth)acrylic-based polymer can be obtained, for example, by polymerizing a (meth)acrylic-based monomer and a polyfunctional monomer through emulsion polymerization, suspension polymerization, solution polymerization or the like.

Examples of the (meth)acrylic-based monomer include acrylic acid, methyl acrylate, ethyl acrylate, n-butyl acrylate, isobutyl acrylate, t-butyl acrylate, dodecyl acrylate, stearyl acrylate, 2-ethylhexyl acrylate, tetrahydrofurfuryl acrylate, diethylaminoethyl acrylate, methacrylic acid, methyl methacrylate, ethyl methacrylate, propyl methacrylate, n-butyl methacrylate, isobutyl methacrylate, t-butyl methacrylate, n-octyl methacrylate, dodecyl methacrylate, 2-ethylhexyl methacrylate, stearyl methacrylate, and diethylaminoethyl methacrylate.

Examples of the polyfunctional monomer include divinylbenzene, ethylene glycol di(meth)acrylate, and trimethylolpropane triacrylate.

As the constituent monomer of the crosslinked poly(meth)acrylic-based polymer, a monomer other than a (meth)acrylic-based monomer and a polyfunctional monomer may be used. Examples of the other monomer include glycol esters of (meth)acrylic acid such as ethylene glycol mono(meth)acrylate and polyethylene glycol mono(meth)acrylate, alkyl vinyl ethers such as methyl vinyl ether and ethyl vinyl ether; vinyl esters such as vinyl acetate and vinyl butyrate; N-alkyl substituted (meth)acrylamides such as N-methylacrylamide, N-ethylacrylamide, N-methylmethacrylamide, and N-ethylmethacrylamide; nitrites such as acrylonitrile and methacrylonitrile; and a styrene-based monomer such as styrene, p-methylstyrene, p-chlorostyrene, chloromethylstyrene, and α-methylstyrene.

As described above, since spherical cavities can be uniformly distributed, it is preferable that the thermally decomposable resin be formed of a spherical resin particle. The lower limit of the average particle size of the resin particle is preferably 0.1 μm, more preferably 0.5 μm, and still more preferably 1 μm. On the other hand, the upper limit of the average particle size of the resin particle is preferably 100 μm, more preferably 50 μm, still more preferably 30 μm, and particularly preferably 10 μm. The resin particle is thermally decomposed to form a cavity in the portion where the resin is present during formation of the insulating layer. Accordingly, with an average particle size of the resin particle of less than the lower limit, the cavity may be hardly formed in the insulating layer. In contrast, with an average particle size of the resin particle of more than the upper limit, the distribution of cavities in the insulating layer is hardly uniform, so that the distribution of dielectric constant may be easily biased.

<Method for Producing Resin Composition>

A method for producing the resin composition enables to produce a resin composition containing a polyamic acid and a solvent, the polyamic acid having a repeating unit represented by the following general formula (1) in a molecular chain, the molecular chain having a structure represented by the following general formula (2) at one end or both ends, i.e. the resin composition. The method for producing the resin composition comprises a polymerization process and a process for mixing a thermally decomposable resin.

[Chemical Formula 17]

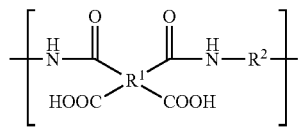
(1)

[Chemical Formula 18]

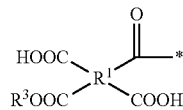
(2)

wherein, in general formula (1), $R^1$ is a tetravalent organic group; and $R^2$ is a divalent organic group.

[Chemical Formula 18]

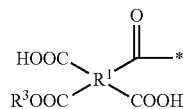
(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other, and * represents a binding site to a portion different from the structure represented by general formula (2) in the molecular chain.

(Polymerization Process)

In the polymerization process, an acid dianhydride represented by the following general formula (3) and a diamine compound represented by the following general formula (4) are polymerized in the presence of an aprotic polar solvent and a reaction control agent.

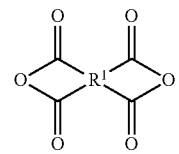

wherein, in general formula (3), $R^1$ is as defined for $R^1$ in general formula (1)

[Chemical Formula 20]

$$H_2N-R^2-NH_2 \quad (4)$$

wherein, in general formula (4), $R^2$ is as defined for $R^2$ in general formula (1)

Since the polymerization process is the same as the polymerization process in the first embodiment, detailed description thereof is omitted.

(Process for Mixing Thermally Decomposable Resin)

In a process for mixing the thermally decomposable resin, a thermally decomposable resin is mixed with the reaction mixture after the polymerization process.

Since the thermally decomposable resin may be the same as the thermally decomposable resin of the resin composition described above, detailed description thereof is omitted.

The content of the thermally decomposable resin is appropriately determined based on the solid content of the resin composition, such that the porosity of the insulating layer to be formed has a desired value. The porosity may be the same as the porosity in the process for dispersing the pore forming agent in the first embodiment described above.

(Advantage)

Regarding the resin composition and the method for producing the resin composition, a thermally decomposable resin contained in the resin composition for forming an insulating layer is thermally decomposed by heating during curing, so that a cavity can be easily formed in the portion where the thermally decomposable resin is present during formation of the insulating layer.

Third Embodiment

<Resin Composition>

The resin composition is a resin composition containing a polyamic acid and a solvent. Further, the resin composition contains a hollow filler.

The viscosity of the resin composition at 30° C. may be the same as that of the resin composition in the first embodiment. Further, it is preferable that the polyamic acid having an amino group at both ends of the molecular chain and the free diamine compound be not substantially contained in the resin composition.

(Polyamic Acid)

The polyamic acid has a repeating unit represented by the following general formula (1) in a molecular chain, the molecular chain having a structure represented by the following general formula (2) at one end or both ends,

[Chemical Formula 21]

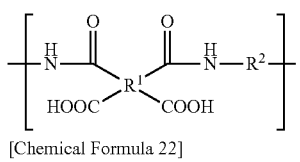
(1)

[Chemical Formula 22]

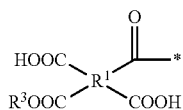
(2)

Since the polyamic acid may be the same as the polyamic acid in the first embodiment, detailed description thereof is omitted.

(Solvent)

Since the solvent may be the same as the solvent in the first embodiment, detailed description thereof is omitted.

(Hollow Filler)

With use of the resin composition containing a hollow filler for forming an insulating layer, the hollow portion inside the hollow filler makes a cavity. Further, with use of the resin composition containing a hollow filler, the flexibility and mechanical strength of the resulting insulating layer can be easily controlled.

Examples of the hollow filler include a shirasu balloon, a glass balloon, a ceramic balloon, and an organic resin balloon. In particular, it is preferable that the hollow filler be an organic resin balloon, a glass balloon, or a combination thereof. An organic resin balloon tends to increase the flexibility of the resulting insulating layer. A glass balloon tends to increase the mechanical strength of the resulting insulating layer. Accordingly, use of an organic resin balloon, a glass balloon, or a combination thereof as the hollow tiller enhances the flexibility and mechanical strength controllability of the resulting insulating layer.

The lower limit of the average particle size of the hollow filler is preferably 1 μm, more preferably 5 μm. On the other hand, the upper limit of the average particle size of the hollow filler is preferably 100 μm, more preferably 50 μm, and still more preferably 30 μm. With an average particle size of the hollow filler less than the lower limit, the volume of the hollow portion to make a cavity in each hollow filler decreases, so that the porosity in the insulating layer may not be secured. In contrast, with an average particle size of the hollow filler more than the upper limit, the distribution of the cavities in the insulating layer is hardly uniform, so that the dielectric constant distribution may be easily biased.

<Method for Producing Resin Composition>

A method for producing the resin composition enables to produce a resin composition containing a polyamic acid and a solvent, the polyamic acid having a repeating unit represented by the following general formula (1) in a molecular chain, the molecular chain having a structure represented by the following general formula (2) at one end or both ends, i.e. the resin composition. The method for producing the resin composition comprises a polymerization process and a process for dispersing a hollow filler.

[Chemical Formula 23]

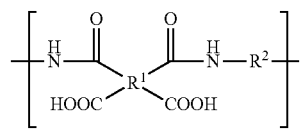
(1)

wherein, in general formula (1), $R^1$ is a tetravalent organic group; and $R^2$ is a divalent organic group

[Chemical Formula 24]

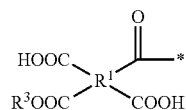
(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other; and * represents a binding site to a portion different from the structure represented by general formula (2) in the molecular chain.

(Polymerization Process)

In the polymerization process, an acid dianhydride represented by the following general formula (3) and a diamine compound represented by the following general formula (4) are polymerized in the presence of an aprotic polar solvent and a reaction control agent.

[Chemical Formula 25]

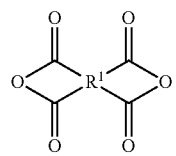
(3)

wherein, in general formula (3). $R^1$ is as defined for $R^1$ in general formula (1)

[Chemical Formula 26]

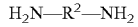
$H_2N-R^2-NH_2$ (4)

wherein, in general formula (4), $R^2$ is as defined for $R^2$ in general formula (I)

Since the polymerization process is the same as the polymerization process in the first embodiment, detailed description thereof is omitted.

(Process for Dispersing Hollow Filler)

In the process for dispersing a hollow filler, the hollow filler is dispersed in the reaction mixture after the polymerization process.

Since the hollow filler may be the same as the hollow filler in the resin composition described above, detailed description thereof is omitted.

The content of the hollow filler is appropriately determined based on the solid content of the resin composition, such that the porosity of the insulating layer to be formed has a desired value. The porosity may be the same as the porosity in the process for dispersing the pore forming agent in the first embodiment described above.

(Advantage)

Regarding the resin composition and the method for producing the resin composition, the hollow filler contained in the resin composition for forming an insulating layer allows the flexibility and mechanical strength of the resulting insulating layer to be easily controlled.

Other Embodiments

It should be considered that the embodiments disclosed herein are exemplary in all respects and not restrictive. The scope of the present invention is not limited to the constitution of the embodiments, but is indicated by claims and is intended to include the same meaning equivalent to the claims and all the modifications within the scope.

In the embodiments described above, the cases where the resin composition contains the pore forming agent, the thermally decomposable resin or the hollow filler alone have been described. Alternatively, the resin composition may contain two or all three of them.

Further, a resin composition containing neither a pore forming agent, a thermally decomposable resin, nor a hollow filler is also intended to be included in the present invention. In the case where such a resin composition is used as the resin composition for forming an insulating layer, a solid insulating layer containing no cavity is formed.

In the embodiments described above, an insulated electrical wire having a linear conductor and an insulating layer that covers the conductor directly or via another layer has been described. Alternatively, a finish coat layer may be further provided on the outer peripheral side of the insulating layer. In particular, with a finish coat layer for imparting lubricity, the stress caused by friction between insulated electrical wires during compression processing for increase in the number of coil turns and the occupancy, and damage to the insulating layer due to the stress can be reduced. The resin for constituting the finish coat layer may be any resin having lubricity, and examples thereof include paraffins such as a liquid paraffin and a solid paraffin, and various waxes.

In the embodiment, the method for producing the insulating layer of an insulated electrical wire by application and baking of the resin composition has been described. Alternatively, in the case where the insulating layer has a multi-layer structure, production may be achieved by coextrusion. The production of an insulating layer by coextrusion allows a multi-layered insulating layer to be produced at a time, so that the production efficiency is high.

EXAMPLES

The resin composition of the present disclosure is specifically described based on Examples, though the present invention is not limited to Examples.

No. 1

First, N-methyl-2-pyrrolidone (NMP) as aprotic polar solvent and methanol as reaction control agent were mixed at room temperature in a 1 L flask equipped with a stirring blade, and in the resulting solution, a diamine compound 4,4'-diamino-diphenyl ether (ODA) was dissolved. Then, while stirring the solution at 200 rpm, an acid dianhydride PMDA divided into two in approximately equal amounts each was added at intervals of 10 minutes, that is, at a charging time of 10 minutes, and the solution was left standing at room temperature for 2 hours. The mixing ratio (molar ratio) between PMDA and ODA was as shown in Table 1, and the mixing ratio of the reaction control agent was 60. Further, the amount of NMP was adjusted to have a concentration of the resulting polyamic acid of 26 mass %.

The resin composition thus obtained was applied and baked on the surface of a conducting wire having an average conductor diameter (average diameter) of 1 mm by a conventional method so as to form an insulating layer having an average thickness of 40 μm. An insulated electrical wire was thus produced.

Nos. 2, 3, 6 and 9

An insulated electrical wire was produced in the same manner as in No. 1, except that the concentration of the polyamic acid was changed as in Table 1, and the mixing ratio of the reaction control agent was set to 70 (No. 2), 100 (No. 3), 310 (No. 6), or 120 (No. 9).

Nos. 4 and 5

A resin composition was obtained in the same manner as in No. 1, except that the reaction control agent was not used (mixing ratio: 0) and the concentration of the polyamic acid was changed as shown in Table 1. Since the viscosity of the resin composition in No. 4 was too high, application was unable to be performed, so that no insulated electrical wire was produced. Also, since the resin composition in No. 5 was gelled, application was unable to be performed, so that no insulated electrical wire was produced.

Nos. 7, 8 and 18

An insulated electrical wire was produced in the same manner as in No. 1, except that ethanol was used as the reaction control agent and the mixing ratio of ethanol was set to 60 (No. 7), 350 (No. 8), or 100 (No. 18).

No. 10

An insulated electrical wire was produced in the same manner as in No. 1, except that a mixed solvent of NMP and DMAc (mixing ratio 20:80) was used as aprotic polar solvent, the concentration of polyamic acid was changed as shown in Table 1, and the mixing ratio of the reaction control agent was set to 100.

Nos. 11 to 13

An insulated electrical wire was produced in the same manner as in No. 1, except that a mixture of PMDA and BPDA (mixing ratio 35:65) was used as acid dianhydride, the concentration of polyamic acid was changed as shown in Table 1, and the mixing ratio of the reaction control agent was set to 100 (No. 11), 210 (No. 12), or 300 (No. 13).

Nos. 14 to 17

An insulated electrical wire was produced in the same manner as in No. 1, except that a mixture of ODA and 2,2-bis[4-(4-aminophenoxy)phenyl]propane (BAPP) (mixing ratio 70:30) was used as the diamine compound, the concentration of polyamic acid was changed as shown in Table 1, and the mixing ratio of the reaction control agent was set to 30 (No. 14), 60 (No. 15), 100 (No. 16), or 200 (No. 17).

No. 19

An insulated electrical wire was produced in the same manner as in No. 1, except that 1-propanol was used as the reaction control agent with a mixing ratio of 100.

No 20

An insulated electrical wire was produced in the same manner as in No. 1, except that 1-butanol was used as the reaction control agent with a mixing ratio of 100.

No. 21

A resin composition containing a chemical foaming agent was obtained by dispersing the chemical foaming agent (azodicarbonamide) as a pore forming agent at a ratio of 10 phr in a reaction mixture obtained by the same polymerization method for the same composition as in No. 1. In the resin composition, the amount of NMP was adjusted, such that the concentration of the resulting polyamic acid was 29 mass %. Herein, "phr" refers to mass part per 100 parts by mass of the resin.

The resin composition thus obtained was applied and baked on the surface of a conducting wire having an average conductor diameter (average diameter) of 1 mm by a conventional method to form an insulating layer having an average thickness of 40 µm, so that an insulated electrical wire was produced.

No. 22

An insulated electrical wire was produced in the same manner as in No. 21, except that a thermally expandable microcapsule (core material: azodicarbonamide, outer shell: vinylidene chloride-acrylonitrile copolymer) was dispersed at a ratio of 10 phr instead of the chemical foaming agent.

No. 23

An insulated electrical wire was produced in the same manner as in No. 21, except that a spherical hollow forming particle (average particle diameter: 3 µm, core: (meth) acrylic-based crosslinked polymer product, shell: silicone) was dispersed at a ratio of 30 phr instead of the chemical foaming agent, and the amount of NMP was adjusted, such that the concentration of the resulting polyamic acid was 28 mass %.

No. 24

A resin composition containing a glass balloon was obtained by dispersing a glass balloon (average particle size: 18 dun) as hollow filler at a ratio of 30 phr in a reaction mixture obtained by the same polymerization method for the same composition as in No. 1. In the resin composition, the amount of NMP was adjusted such that the concentration of the resulting polyamic acid was 28 mass %.

The resin composition thus obtained was applied and baked on the surface of a conducting wire having an average conductor diameter (average diameter) of 1 mm by a conventional method so as to form an insulating layer having an average thickness of 40 µm. An insulated electrical wire was thus produced.

[Evaluation]

The resin compositions obtained in No. 1 to No. 24 were subjected to measurement of the viscosity, average molecular weight and proportion of terminal structure. The gelled composition in No. 5 was not subjected to measurement of the viscosity and average molecular weight.

Further, the insulated electrical wires obtained in No. 1 to No. 3 and No. 6 to No. 24 were subjected to measurement of the film elongation and the glass transition temperature, and a determination was made including observation of the appearance of winding. The results are shown in Table 1.

The evaluation values were measured and determined by the following procedure.

<Viscosity>

The viscosity was measured by a B-type viscometer ("RB-80L" manufactured by Toki Sangyo Co, Ltd.) at a measurement temperature of 30° C., rotated at a rotation speed of 6 rpm for 3 minutes.

<Average Molecular Weight>

The number average molecular weight (Mn), weight average molecular weight (Mw), and molecular weight distribution (Mw; Mn) of a polyamic acid were calculated by analyzing the resin composition with "GPC system" of Tosoh Corporation. As developing solvent during the analysis, N-methyl-2-pyrrolidone in which 30 mmol of phosphoric acid and 10 mmol of lithium bromide were dissolved was used, and as standard substance, polystyrene was used. As the column during the analysis, two "TSKgel GMH HR-H" manufactured by Tosoh Corporation connected in series were used, and as a guard column, "TSK Guard Colum HHR-H" was used. The measurement was performed at a flow rate of 0.5 mL/min for a measurement time of 60 minutes.

<Proportion of Terminal Structure>

First, a target resin composition was diluted with N-methyl-2-pyrrolidone (NMP) and added dropwise to acetone while stirring with a stirrer. A solid content thus obtained was collected and dried under vacuum for 12 hours or more. About 30 mg of the solid content was taken, dissolved in dimethyl sulfoxide-d6 (DMSO-d6), and measured by $^1$H NMR ("A VANCE 111 HD with use of Ascend 500" manufactured by Bruker) in a quantitative mode to obtain a spectrum. The measurement conditions were as follows: Flip Angle=13.0 is. PD-70 s, and cumulated number 64.

Subsequently, from the resulting spectrum, the number of protons (referred to as A) derived from the benzene ring appearing in a chemical shift of 86 ppm or more and 69 ppm or less (hereinafter, described as "δ6 or more and 89 or less") and the number of protons (referred to as B) derived from $R^3$ appearing in 83 or more and 85 or less were obtained. The numbers of protons per mole of the repeating unit and the terminal structure were calculated (NA [mol] and NB [mol], respectively), and by using NA and NB, the ratio of the terminal structure relative to 1 mol of the repeating unit (proportion of the structure represented by general formula (2) described above) was calculated from (B/NB)/(A/NA). The chemical shift δ [ppm] herein is a value based on the proton of tetramethylsilane.

The number of protons NA appearing in 86 or more and 89 or less per 1 mole of the repeating unit was calculated as follows.

No. 1 to No. 10, and No. 18 to No. 24

The number of protons derived from the benzene ring of PMDA, appearing in 86 or more and 89 or less is 2 per PMDA molecule. Further, the number of protons derived from the benzene ring of ODA, appearing in 86 or more and 89 or less is 8 per ODA molecule. Since 1 mol of PMDA and 1 mol of ODA are contained in 1 mol of the repeating unit, the number of protons NA per 1 mol of the repeating unit is: 2+8-10 mol.

No. 11 to No. 13

The number of protons derived from the benzene ring of BPDA, appearing in 86 or more and 89 or less is 6 per molecule of BPDA. PMDA and ODA are as described above. Since 0.35 mol of PMDA, 0.65 mol of BPDA, and 1 mol of ODA are contained in 1 mol of the repeating unit, the number of protons NA per 1 mol of the repeating unit is: 0.35×2+0.65×6+8=12.6 mol.

No. 14 to No. 17

The number of protons derived from the benzene ring of BAPP, appearing in 66 or more and 89 or less is 16 per molecule of BAPP. PMDA and ODA are as described above. Since 1 mol of PMDA, 0.7 mol of ODA, and 0.3 mol of BAPP are contained in 1 mol of the repeating unit, the number of protons NA per 1 mol of the repeating unit is: 2+8×0.7+16×0.3=12.4 mol.

The number of protons NB appearing in 83 or more and 89 or less per 1 mole of the terminal structure is as follows: NB=3 in the case of using methanol as reaction control agent, and NB=2 in the case of using ethanol.

<Film Elongation=

The film elongation (fracture elongation) was measured as follow. A tubular insulating layer obtained by removing the conductor from a resulting insulated electrical wire was subjected to a tensile test using a tensile tester (Autograph AGS-X manufactured by Shimadzu Corporation) with a distance between chucks of 20 mm, at a rate of 10 mm/min.

<Glass Transition Temperature>

The glass transition temperature was measured as follow. A tubular insulating layer obtained by removing the conductor from a resulting insulated electrical wire was subjected to the measurement of glass transition temperature using a dynamic viscoelasticity measuring device (DMS) (EXSTAR DMS6100 manufactured by Yamato Scientific Co., Ltd.) in a temperature range of 20° C. to 500° C., at a temperature rise rate of 10° C./min.

<Determination>

Based on the film elongation, the glass transition temperature, and the appearance observation of winding, the insulated electrical wire was determined by the following criteria.

A: Both of the film elongation and the glass transition temperature are good, and the appearance of winding is also normal.

B: Both of the film elongation and the glass transition temperature are good, but foaming is observed in the appearance of winding.

C: The film elongation or the glass transition temperature is unsatisfactory.

TABLE 1

| | Acid dianhydride | | Diamine | | | | | Average molecular weight | |
| --- | --- | --- | --- | --- | --- | --- | --- | --- | --- |
| | | | | | | | | Number average | Weight average |
| | PMDA (Molar ratio) | BPDA (Molar ratio) | ODA (Molar ratio) | BAPP (Molar ratio) | Solvent | Concentration (mass %) | Viscosity @ 30° C. (cps) | molecular weight (Mn) | molecular weight (Mw) |
| No. 1 | 100 | — | 100 | — | NMP | 26 | 23,600 | 20,800 | 37,000 |
| No. 2 | 100 | — | 100 | — | NMP | 26 | 18,000 | 17,800 | 29,100 |
| No. 3 | 100 | — | 100 | — | NMP | 30 | 16,600 | 11,300 | 20,400 |
| No. 4 | 100 | — | 100 | — | NMP | 26 | 218,000 | 83,900 | 162,000 |
| No. 5 | 100 | — | 100 | — | NMP | 30 | gelation | — | — |
| No. 6 | 100 | — | 100 | — | NMP | 26 | 1,560 | 6,230 | 11,300 |
| No. 7 | 100 | — | 100 | — | NMP | 26 | 35,100 | 26,100 | 49,400 |
| No. 8 | 100 | — | 100 | — | NMP | 26 | 3,500 | 5,400 | 9,720 |
| No. 9 | 100 | — | 100 | — | NMP | 32 | 13,100 | 7,440 | 14,100 |
| No. 10 | 100 | — | 100 | — | NMP/DMAc | 32 | 10,300 | 15,340 | 29,900 |
| No. 11 | 35 | 65 | 100 | — | NMP | 26 | 20,800 | 18,300 | 32,000 |
| No. 12 | 35 | 65 | 100 | — | NMP | 32 | 22,600 | 8,720 | 16,300 |
| No. 13 | 35 | 65 | 100 | — | NMP | 36 | 30,000 | 6,600 | 13,100 |
| No. 14 | 100 | — | 70 | 30 | NMP | 21 | 24,600 | 43,900 | 65,400 |
| No. 15 | 100 | — | 70 | 30 | NMP | 26 | 19,000 | 37,100 | 56,600 |
| No. 16 | 100 | — | 70 | 30 | NMP | 26 | 14,400 | 27,100 | 41,500 |
| No. 17 | 100 | — | 70 | 30 | NMP | 40 | 4,790 | 8,820 | 14,800 |
| No. 18 | 100 | — | 100 | — | NMP | 26 | 19,800 | 16,800 | 32,400 |
| No. 19 | 100 | — | 100 | — | NMP | 26 | 18,000 | 16,300 | 30,900 |
| No. 20 | 100 | — | 100 | — | NMP | 26 | 22,400 | 17,800 | 35,100 |
| No. 21 | 100 | — | 100 | — | NMP | 29 | 23,600 | 20,800 | 37,000 |
| No. 22 | 100 | — | 100 | — | NMP | 29 | 23,690 | 20,800 | 37,000 |
| No. 23 | 100 | — | 100 | — | NMP | 28 | 12,000 | 20,800 | 37,000 |
| No. 24 | 100 | — | 100 | — | NMP | 28 | 8,500 | 20,800 | 37,000 |

TABLE 1-continued

| | | Average molecular weight Mw/Mn | Proportion of terminal structure (mol) | Evaluation result of insulated electrical wire | | |
|---|---|---|---|---|---|---|
| | | | | Film elongation (%) | Glass transition temperature (° C.) | Determination |
| No. 1 | | 1.78 | 0.043 | 110 | 390 | A |
| No. 2 | | 1.64 | 0.051 | 112 | 389 | A |
| No. 3 | | 1.82 | 0.063 | 105 | 385 | A |
| No. 4 | | 1.93 | 0 | — | — | — |
| No. 5 | | — | 0 | — | — | — |
| No. 6 | | 1.81 | 0.121 | 56 | 379 | C |
| No. 7 | | 1.89 | 0.041 | 108 | 385 | A |
| No. 8 | | 1.80 | 0.073 | 27 | 372 | C |
| No. 9 | | 1.90 | 0.098 | 108 | 380 | A |
| No. 10 | | 1.95 | 0.081 | 111 | 381 | A |
| No. 11 | | 1.75 | 0.068 | 116 | 280 | A |
| No. 12 | | 1.87 | 0.076 | 105 | 281 | A |
| No. 13 | | 1.98 | 0.085 | 105 | 280 | A |
| No. 14 | | 1.79 | 0.062 | 120 | 330 | A |
| No. 15 | | 1.95 | 0.069 | 115 | 328 | A |
| No. 16 | | 1.88 | 0.073 | 112 | 327 | A |
| No. 17 | | 1.84 | 0.101 | 45 | 327 | C |
| No. 18 | | 1.93 | 0.070 | 116 | 378 | A |
| No. 19 | | 1.90 | 0.072 | 108 | 375 | A |
| No. 20 | | 1.97 | 0.066 | 105 | 374 | A |
| No. 21 | | 1.78 | 0.043 | 85 | 387 | B |
| No. 22 | | 1.78 | 0.043 | 90 | 388 | B |
| No. 23 | | 1.78 | 0.043 | 91 | 385 | B |
| No. 24 | | 1.78 | 0.043 | 87 | 386 | B |

In Table 1, the molar ratios of acid dianhydride, diamine, and reaction control agent represent relative values to a total molar amount of acid dianhydride of 100. Further, "-" in the evaluation results of insulated electrical wires in Table 1 means unmeasured or unmeasurable data.

As shown in Table 1, any of the resin compositions in No. 1 to No. 3, No. 7, No. 9 to No. 16, and No. 18 to No. 20 has an appropriate viscosity while having a high concentration, and the insulating layer of an insulated electrical wire made of the resin composition has an excellent film elongation of 100% or more. Further, the insulating layer of an insulated electrical wire made of any of these resin compositions has no decrease in the glass transition temperature, so that it can be seen that the performance deterioration of the polyimide after curing is small.

In contrast, the resin composition in No. 4 with a molecular chain terminal having no structure of general formula (2) described above was unable to be subjected to application, because the polymerization reaction proceeded excessively to increase the molecular weight, resulting in excessively high viscosity. Similarly, the resin composition in No. 5 with a molecular chain terminal having no structure of general formula (2) described above was unable to be subjected to application due to gelation. The resin compositions in No. 6 and No. 17 having an amount of the terminal structure of 0.1 mol or more relative to 1 mol of the repeating unit of the molecular chain had too low viscosity, and resulted in insufficient film elongation. The resin composition in No. 8 having a content of the reaction control agent of more than 300 mol relative to 100 mol of the acid dianhydride had a too low molecular weight, and resulted in insufficient film elongation.

From the above, the polyamic acid in the resin composition with a proportion of the structure represented by general formula (2) described above relative to 1 mol of the repeating unit represented by general formula (1) described above of 0.001 mol or more and 0.1 mol or less enables the resin composition to have an appropriate viscosity even with a high concentration, and it can be said that the insulating layer of an insulated electrical wire made thereof has an excellent film elongation of 100% or more.

Further, the resin compositions in No. 21 to No. 24 having cavities inside of the insulating layer formed by addition of a pore forming agent or a hollow filler also have an appropriate viscosity even with a high concentration, and it can be seen that the insulating layer of an insulated electrical wire made thereof has an excellent film elongation of 90% or more.

The invention claimed is:

1. A resin composition comprising a polyamic acid and a solvent,
   wherein the polyamic acid has a repeating unit represented by the following general formula (1) in a molecular chain,
   the molecular chain has a structure represented by the following general formula (2) at one end or both ends, and
   the proportion of the structure represented by the following general formula (2) relative to 1 mol of the repeating unit represented by the following general formula (1) is 0.001 mol or more and 0.1 mol or less:

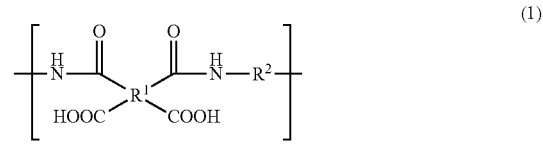

(1)

wherein, in general formula (1), $R^1$ is a tetravalent organic group; and $R^2$ is a divalent organic group;

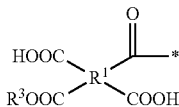
(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other; and * represents a binding site to a portion different from the structure represented by general formula (2) in the molecular chain, wherein a weight average molecular weight of the polyamic acid is from 15,000 or more to 100,000 or less, a number average molecular weight of the polyamic acid is from 8,000 or more to 50,000 or less, and a ratio of the weight average molecular weight to the number average molecular weight of the polyamic acid is 2.3 or less, and wherein a viscosity of the resin composition at 30° C. measured by a B-type viscometer is from 10,000 cps or more to 100,000 cps or less.

2. The resin composition according to claim 1, wherein the polyamic acid is a polymer having a repeating unit in which $R^1$ is a benzene-1,2,4,5-tetrayl group.

3. The resin composition according to claim 1, wherein the polyamic acid is a copolymer having a repeating unit in which $R^1$ is a benzene-1,2,4,5-tetrayl group and a repeating unit in which $R^1$ is a biphenyl-3,3',4,4'-tetrayl group.

4. The resin composition according to claim 3, wherein the average molar ratio between the repeating unit in which $R^1$ is a benzene-1,2,4,5-tetrayl group and the repeating unit in which $R^1$ is a biphenyl-3,3',4,4'-tetrayl group is 2:8 or more and 4:6 or less.

5. The resin composition according to claim 1, wherein the resin composition comprises substantially no polyamic acid having an amino group at both ends of the molecular chain and no free diamine compound.

6. The resin composition according to claim 1, wherein the concentration of the polyamic acid is 25 mass % or more.

7. The resin composition according to claim 1, wherein the solvent is an aprotic polar solvent.

8. The resin composition according to claim 1, wherein the resin composition comprises a pore forming agent.

9. The resin composition according to claim 8, wherein the pore forming agent is a chemical foaming agent.

10. The resin composition according to claim 8, wherein the pore forming agent is a thermally expandable microcapsule having a core material containing a thermal expansion agent and an outer shell surrounding the core material.

11. The resin composition according to claim 10, wherein the main component of the core material is azobisisobutyronitrile or azodicarbodiamide.

12. The resin composition according to claim 10, wherein the main component of the outer shell is a vinylidene chloride-acrylonitrile copolymer.

13. The resin composition according to claim 8, wherein the pore forming agent is a hollow forming particle having a core-shell structure.

14. The resin composition according to claim 13, wherein the core of the hollow forming particle contains a thermally decomposable resin as main component, and the thermal decomposition temperature of the main component of the shell of the hollow forming particle is higher than the thermal decomposition temperature of the thermally decomposable resin.

15. The resin composition according to claim 14, wherein the main component of the shell of the hollow forming particle is silicone.

16. The resin composition according to claim 8, wherein the pore forming agent is a high boiling point solvent having a boiling point higher than that of the solvent.

17. The resin composition according to claim 16, wherein the boiling point of the high boiling point solvent is 180° C. or more and 300° C. or less.

18. The resin composition according to claim 1, wherein the resin composition comprises a thermally decomposable resin.

19. The resin composition according to claim 18, wherein the thermally decomposable resin is a crosslinked product of a (meth)acrylic-based polymer.

20. The resin composition according to claim 18, wherein the thermally decomposable resin is formed of a spherical resin particle, and the resin particle has an average particle size of 0.1 μm or more and 50 μm or less.

21. The resin composition according to claim 1, wherein the resin composition comprises a hollow filler.

22. The resin composition according to claim 21, wherein the hollow filler is an organic resin balloon, a glass balloon, or a combination thereof.

23. A method for producing a resin composition containing a polyamic acid and a solvent, the polyamic acid having a repeating unit represented by the following general formula (1) in a molecular chain, the molecular chain having a structure represented by the following general formula (2) at one end or both ends, the method comprising:
polymerizing an acid dianhydride represented by the following general formula (3) and a diamine compound represented by the following general formula (4) in the presence of an aprotic polar solvent and a reaction control agent,
wherein the content of the reaction control agent relative to 100 mole of the acid dianhydride is 0.1 mol or more and 300 mol or less in the polymerization:

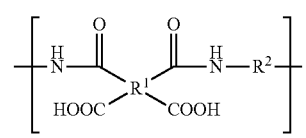
(1)

wherein, in general formula (1), $R^1$ is a tetravalent organic group; and $R^2$ is a divalent organic group;

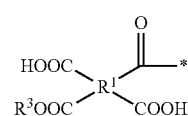
(2)

wherein, in general formula (2), $R^1$ is as defined for $R^1$ in general formula (1); $R^1$ in general formula (2) may be the same as or different from $R^1$ in general formula (1); $R^3$ is an organic group having 15 or less carbon atoms; in the case where both ends of the molecular chain has a structure of general formula (2), the two $R^1$ may be the same as or different from each other and the two $R^3$ may be the same as or different from each other; and * represents a binding site to a portion different from the structure represented by general formula (2) in the molecular chain;

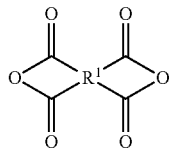 (3)

wherein, in general formula (3), $R^1$ is as defined for $R^1$ in general formula (1);

 (4)

wherein, in general formula (4), $R^2$ is as defined for $R^2$ in general formula (1), and wherein a weight average molecular weight of the polyamic acid is from 15,000 or more to 100,000 or less, a number average molecular weight of the polyamic acid is from 8,000 or more to 50,000 or less, and a ratio of the weight average molecular weight to the number average molecular weight of the polyamic acid is 2.3 or less, and wherein a viscosity of the resin composition at 30° C. measured by a B-type viscometer is from 10,000 cps or more to 100,000 cps or less.

24. The method for producing a resin composition according to claim 23, wherein the acid dianhydride and the diamine compound are in substantially equimolar amounts in the polymerization.

25. The method for producing a resin composition according to claim 23, wherein $R^1$ is a benzene-1,2,4,5-tetrayl group.

26. The method for producing a resin composition according to claim 23, wherein $R^1$ are a benzene-1,2,4,5-tetrayl group and a biphenyl-3,3',4,4'-tetrayl group.

27. The method for producing a resin composition according to claim 26, wherein the molar ratio between the acid dianhydride having a benzene-1,2,4,5-tetrayl group as $R^1$ and the acid dianhydride having a biphenyl-3,3',4,4'-tetrayl group as $R^1$ is 2:8 or more and 4:6 or less.

28. The method for producing a resin composition according to claim 23, comprising dispersing a pore forming agent in the reaction mixture after the polymerization.

29. The method for producing a resin composition according to claim 23, comprising mixing a thermally decomposable resin with the reaction mixture after the polymerization.

30. The method for producing a resin composition according to claim 23, comprising dispersing a hollow filler in the reaction mixture after the polymerization.

31. An insulated electrical wire having a linear conductor and an insulating layer that covers the conductor directly or via another layer, wherein the insulating layer is formed of the resin composition according to claim 1.

* * * * *